United States Patent

[11] 3,540,553

| [72] | Inventor | Ludwik S. Bialkowski<br>1517 Sussex Road, Troy, Ohio 45373 |
|---|---|---|
| [21] | Appl. No. | 694,133 |
| [22] | Filed | Dec. 28, 1967 |
| [45] | Patented | Nov. 17, 1970 |

[54] BRAKE ASSEMBLY
15 Claims, 5 Drawing Figs.

[52] U.S. Cl. .................................................. 188/78,
188/70, 188/80, 188/152

[51] Int. Cl. ........................................................ F16d 63/00,
F16d 51/14

[50] Field of Search .................................... 188/70, 80,
1, 152.85, 166, 259, 82.84, 130, 192, 78, 1B, 1C

[56] References Cited
UNITED STATES PATENTS

| 2,073,626 | 3/1937 | De Filippis | 188/80 |
| 2,125,617 | 8/1938 | Niemann | 188/80 |
| 2,179,837 | 11/1939 | Wolkoff | 188/70X |
| 2,351,040 | 6/1944 | Hawley | 188/152(.85)UX |
| 3,198,293 | 8/1965 | Mathews | 188/70X |
| 2,889,012 | 6/1959 | Pierce | 188/1(C)UX |

FOREIGN PATENTS

| 405,959 | 2/1934 | Great Britain | 188/80 |
| 1,105,404 | 6/1955 | France | 188/1(C) |

Primary Examiner—Duane A. Reger
Attorney—Jerome P. Bloom

ABSTRACT: A brake assembly utilizing an improved principle of spring deflection to apply a retarding torque. One of two relatively movable parts of the assembly has a plurality of outwardly extending cantilever spring beams and the other part has an element for engaging the ends of the spring beams causing deflection of the beams whereby a positive and retarding force is exerted to impede the relative movement of these two brake parts.

Patented Nov. 17, 1970

3,540,553

INVENTOR.
Ludwik S. Bialkowski.
BY Jerome P. Bloom

BRAKE ASSEMBLY

This invention relates to a new concept in brake assemblies. While having general utility, embodiments are particularly advantageous in application to heavy duty vehicles and will be so described.

Brakes presently used for aircraft, automobiles and like applications provide one or more members suitably controlled to move outwardly and frictionally press against another brake member on a rotating wheel, in the process of which to exert a braking function. The developed torque retards the wheel rotation and eventually brings the wheel and vehicle supported thereon to a complete stop. Disadvantages of brakes of this type are well known. The extended surface contact of the brake members tends to produce excessive and rapid wear. Moreover, the heat generated by the braking process has per se a destructive influence. This occasions the need for frequent brake adjustment and replacement of brake parts, particularly in the case of aircraft applications.

The present invention provides improved brake assemblies which inherently avoid the above-mentioned problems. Its embodiments feature spring beams on a moving part and means associated therewith on a relatively stationary part operative to deflect the beams to exert a braking function.

It is a primary object of the present invention to provide brake apparatus which is not only economical to fabricate but more efficient and satisfactory in use, adaptable to a wide variety of applications and unlikely to malfunction.

A further object of the invention is to obviate disadvantages of friction brakes by providing a new form of brake in which the forces of retardation are supplied through a principle of spring beam deflection.

Another object of the invention is to provide a new brake mechanism which may be simply and inexpensively installed on existing vehicles.

A further object of the invention is to provide a brake mechanism susceptible of modification in multiple aspects to suit various braking requirements.

A further object of the invention is to provide a smooth acting brake lending itself readily to fluid pressure operation under operator supplied impulse.

An additional object of the invention is to provide a brake assembly possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings wherein are shown some but not all the various embodiments of the invention, FIG. 1 is a transverse cross-sectional view of a wheel and brake assembly in accordance with one embodiment of the invention, parts being shown schematically;

Figure 5:
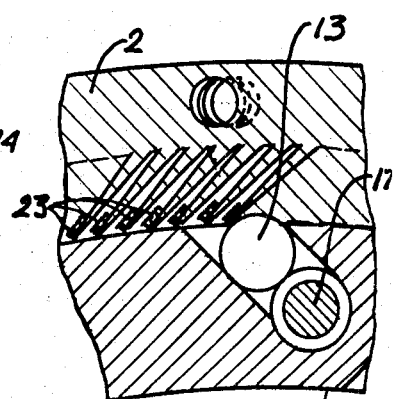
Figure 4:
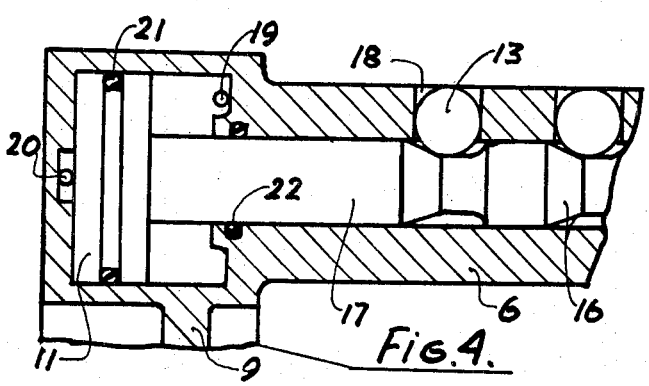

FIG. 4 is an enlarged fragmentary view which schematically illustrates multiple brake control units in accordance with the invention concept; and FIG. 5 is a further fragmentary view, in cross section, showing an alternate form of spring beam construction and indicating diagrammatically a staggered mounting of multiple ring elements, each of which mounts a series of spring beams for securing a staggered braking function in accordance with the invention.

Like parts are indicated by similar characters of reference throughout the several views.

Figure 2:
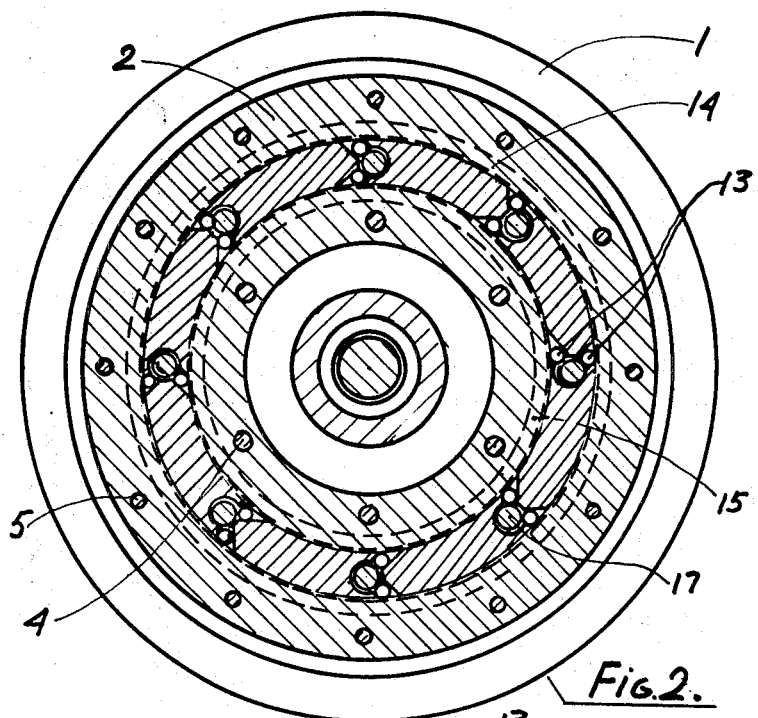
FIG. 2 is a schematic sectional view taken on line A-A of FIG. 1.
Figure 1:
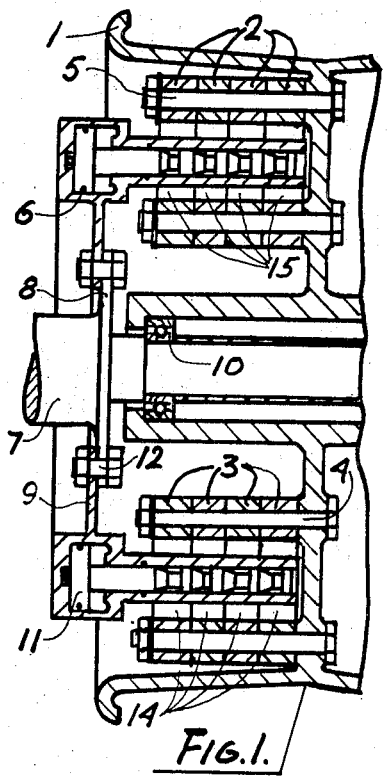

Referring to FIG. 1 a vehicle wheel 1 as there shown is mounted for relative rotary motion on a relatively stationary axle 7 through means including bearings 10. The wheel 1, as illustrated, consists of a tubular hub, a central radial web and, at the outer limit of the web, a tubular rim. This defines at the inner side of the wheel 1 a recess which receives therein concentric sets of stacked rings. The outer rings are identified by the numeral 2 and the inner by the numeral 3. Each set of stacked rings is held in assembled relation by a series of circumferentially spaced bolts. For this purpose the rings are provided with aligned through openings to receive therethrough in the one instance bolts 5 and the other instance bolts 4 by means of which they are fixedly secured to the wheel rim. This structure is clearly shown in FIG. 1 of the drawings.

Each of the rings are rigid members made of spring metal or materials having like characteristics. The inner peripheries of each of the outer rings 2 are cut or otherwise formed to produce therein obliquely projected fingers 14. Because of the physical characteristics of the ring material, such fingers constitute deflectable spring beams. The rings 3 are of materials similar to that of the rings 2 and are similarly provided with spring beams 15. However, in this case, the spring beams are formed to project on their outer periphery. This is clearly shown in FIG. 3 of the drawings. As there seen the spring beams on the respective rings have their projected extremities disposed in concentric' spaced relation and receive therebetween an annular housing 6. Particular note is to be taken that spring beams are inclined obliquely and in the same direction.

The housing 6 has the majority thereof in completely nested relation intermediate the concentric sets of rings 2 and 3. Its one end nests in the wheel recess while its other end projects outwardly thereof. The outer end is formed with a flange 9 secured by bolts 12 to a flange 8 on axle 7. The housing 6 can accordingly be considered a relatively stationary part with respect to the rings 2 and 3 which are relatively moving during rotation of the wheel 1.

Figure 3:
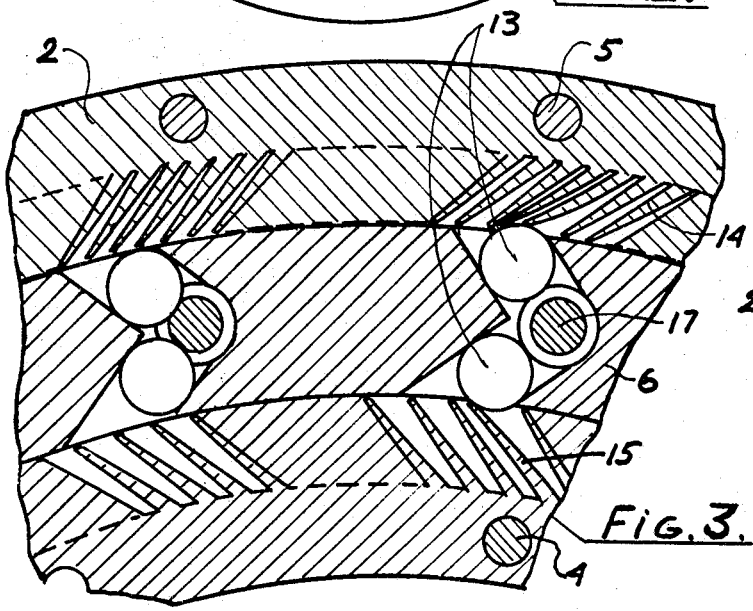
FIG. 3 is a fragmentary sectional view illustrating, in detail, both the nonbraking and braking positions of the elements constituting an embodiment of the invention brake unit, parts being shown in generally schematic fashion.

Note from FIGS. 3 and 4 of the drawings, the housing 6 has defined therein a plurality of generally cylindrical chambers which are expanded to the end thereof disposed outwardly in reference to the wheel 1. Longitudinally disposed in each of these chambers is a control rod 17 which mounts to its projected extremity in the expanded portion of the chamber a piston head 11. The head 11 is circumferentially grooved to accommodate a ring type oil seal 21 and in the adjacent end of the reduced portion of the chamber the rod 17 is circumferentially grooved to accommodate oil seal 22.

Inwardly of the oil seal 22 each rod 17 is reduced in diameter at successive locations along its length with portions of smaller and larger diameter being interconnected by a sloping surface 16 of generally conical form. With each rod 17 as normally disposed in an inoperative position to the outer end of its chamber, noting FIGS. 3 and 4, it is there seen that at each location of rod reduction the housing 6 is formed with oppositely directed relatively diverging passages 18 which open from the opposite surfaces of the housing 6. Disposed within each said passage is a ball element 13 which in the inoperative position of the described brake seats on a reduced portion of the related rod.

In the head or outer end of the expanded portion of each control chamber is a recess into which connects a passage 20 for delivering to the outer surface of the adjacent piston head 11 a pressured flow of oil or like fluid. The relatively remote shoulder which defines the beginning of the reduced portion of each chamber has an opening to a passage 19 from which one may deliver to the opposite side of the piston head 11 a pressured flow of oil or like fluid.

A suitable source of hydraulic fluid is provided in direct connection with the passages 20 and 19 to the expanded portion of each chamber by means operable to selectively apply pressure to one side or the other of the contained piston head 11. By such means, as will be obvious, one may reciprocate a contained control rod 17 for braking purposes.

It will be seen that inner and outer surfaces of housing 6 are in respectively adjacent relation to the spring beams 15 and 14. The openings 18 in the housing allow the balls 13 to be projected into the path of travel of the spring beams and to apply thereto a force for deflection of the beams.

It will be seen with reference to the schematic showing in FIG. 4 that upon the introduction of fluid through the passages 20 the rods 17 are selectively forced inwardly of their chambers, the balls 13 riding up on the related conical surfaces formed on the rods and projected as described. Thus, upon an inward thrust being applied to the rods 17 the balls 13 are caused to ride up on the control surfaces 16 to insure that they are projected into a position wherein they will encounter and deflect the spring beams 14 and 15 in passage of the rings thereby. As will be obvious, when this occurs the rotation of the wheel 1 is retarded, the energy of rotation being absorbed in a stressing of the spring beams and, consequently, the related wheel and the vehicle to which it attaches is quickly brought to a complete stop.

Referring to FIG. 3, a case is shown wherein one rod 17 has not been applied to achieve a braking function while another rod 17 has. It may be seen from this that dependent on the application one may either simultaneously move the rods 17 to exert a braking influence through the balls 13 or may move them in staggered sequence. A further potential of the invention is also illustrated in FIG. 3. In this last respect, it will be noted that there is a greater spacing between the spring beams 15 than between the spring beams 14. This illustrates how one can vary the braking influence that may be exerted through the balls 13. Thus, it may be seen that the balls 13 will deflect one or more of the spring beams in correspondence with the design spacing therebetween.

It is to be understood that while variations are shown in the spacing of the beams in FIG. 3 and differential positioning of the rods 17, this is merely a schematic illustration of the extent one may modify a single invention embodiment in accordance with the invention concepts. It is to be understood that in most instances it will in all likelihood be desirable that the rods 17 simultaneously function and the spring beams to opposite sides of the housing 6 will be of essentially the same nature and have essentially the same spacing. Since the intensity of the applied resistance to inhibit rotation will vary with variations in spacing between spring beams, one can predetermine the needs of a particular application to achieve the necessary and intended result.

FIG. 5 is a diagrammatic illustration of a modification of the spring beams as shown in FIG. 3 to have plate portions 23 applied to their tips whereby to reduce the distance between adjacent beams. This is another way of achieving closer spacing between the beams while retaining a particular deflection characteristic of the beams per se.

FIG. 5 also illustrates the fact that in a series of brake rings forming an assembly, the bolt apertures in the successive ring elements may be relatively offset in reference to their projected spring beams. Thus, when bolted together, successively adjacent rings may have their spring beams in slightly offset relation. In this manner one may achieve a set of spring beams wherein the braking effect will be staggered, the net result of which is a continuing and smooth braking action. The angular offset of the spring beams in successive rings in a set is optimally achieved by locating the holes to receive the bolts 4 or 5 according to a formula yielding the desired result. The differential may, for example, be according to a formula $S/n-1$, wherein S is a spacing between spring beams and n is the number of the rings in the stack.

It should be evident that may modifications in structural details of the invention brake mechanism are readily possible. For example, the spring beams have been shown as formed integrally with the rings 2 and 3. They might also be separate or part of a liner means and riveted or otherwise secured to a basic mounting ring. Moreover, while the ring means are shown as narrow elements in stacked sets for greater versatility, the spring beams may be incorporated in a single wide ring rather than in the plurality as here illustrated. Also, it will not in all instances be necessary that there be both rings 2 and 3. In some applications one or the other may be eliminated and the housing 6 and its contents modified in an obvious manner to operate as described. Thus sufficient braking pressure may be realized with the operation of the set of rings 2 or the set of the rings 3 alone.

As shown, it will be realized that the retarding torque achieved in the use of the invention embodiments is in part a function of the number of spring beams deflected by each ball 13 and affected by the spacing between the beams.

As should be further evident, the wheel 1 may have the brake mechanism accommodated in a cavity or recess on one side or in both sides thereof.

It will of course be obvious that the angularity of the spring beams which are deflectable by the balls 13 will be such that the braking pressure may be applied irrespective of the direction of rotation of the wheel 1. While elements 13 have been shown as having a ball-bearing type construction, they could just as well be cylindrical or have some other configuration offering inclined surfaces for contact with the spring beams.

From the preceding it should be readily obvious that a highly versatile brake assembly may be derived in accordance with the invention, one which has minimal wear characteristics and minimal heat produced in the braking process. Thus, invention embodiments should be long-lasting and require minimal maintenance.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

I claim:

1. A brake assembly for application to retard the movement of one means which moves relative to another, one said means incorporating a plurality of projected cantilever spring beams and the other said means carrying deflecting means and means for selectively applying the deflecting means to produce a blocking intercept between the deflecting means and the spring beams in which said spring beams yield to said deflecting means and apply thereto a resilient opposing pressure and thereby exert a positive and immediate retarding influence to prevent the relative movement of said means, said spring beams being constructed to be self-restoring for continuing or repeated use.

2. A brake assembly particularly adaptable for use in heavy duty vehicles for application to retard the movement of one means which moves relative to another, one of said means incorporating a plurality of projected cantilever spring beams and the other said means carrying deflecting means and means for selectively applying the deflecting means to produce an intercept between the deflecting means and the spring beams and thereby exert a positive and immediate retarding influence to prevent the relative movement of said means, said one of the means first mentioned being adapted to mount to a wheel device which rotates relative said other means, whereby said spring beams are then carried by the wheel device, and said other of said means incorporates said deflecting means in normally retracted condition and said means for selectively applying said deflecting means is arranged for selectively projecting said deflecting means into the path of movement of said spring beams whereby to achieve the deflection of spring beams and apply a retarding influence to rotation of the wheel device.

3. A brake assembly according to claim 2 characterized in that said deflecting means and said projecting means are carried in concentric relation to said spring beams, said projecting means being selectively operable to exert a camming action to produce a braking influence through the medium of said deflecting means.

4. A brake assembly according to claim 2 characterized by fluid pressure responsive means for operating said projecting means.

5. A brake assembly for application to retard the movement of one means which moves relative to another, one said means incorporating a plurality of projecting spring beams carried on rings attachable to a wheel device and having the form of spring fingers extending at an oblique angle from the periphery of said rings, the other said means carrying deflecting means and means for selectively applying the deflecting means to produce an intercept between the deflecting means and the spring fingers, said fingers being spaced apart a distance to allow deflection thereof, the spacing between said fingers being predeterminable to place a desired number of said spring fingers under deflection upon intercept by said deflecting means and thereby exert a positive and retarding influence to impede the relative movement of said means.

6. A brake assembly according to claim 5 characterized by laminar means mounted on said spring fingers to reduce the spacing between their projected extremities.

7. A brake assembly according to claim 1 characterized in that said spring beams are incorporated in projected relation to a peripheral portion of ring means and said deflecting means provide arcuate surfaces for engagement with said spring beams.

8. A brake assembly for application to retard the movement of one means which moves relative to another, one said means incorporating a plurality of projected spring beams and the other said means carrying deflecting means and projecting means for selectively applying the deflecting means to produce an intercept between the deflecting means and the spring beams, said spring beams being incorporated in projected relation to a peripheral portion of ring means including a pair of concentric spaced apart ring means, the outer one thereof having inner peripherally projected spring beams and the inner ring means having on its outer periphery projected spring beams said deflecting means and said projecting means being carried intermediately thereof in concentric relation thereto, there being individual deflecting means which are projectable to engage respective spring beams and thereby exert a positive and immediate retarding influence to impede the relative movement of said means.

9. A brake assembly according to claim 8 characterized in that said deflecting means and projecting means is carried in a housing and there being a circumferentially spaced series of said deflecting means and associated projecting means in said housing.

10. A brake assembly for application to retard the movement of one means which moves relative to another, one said means incorporating a plurality of projected spring beams and the other said means carrying deflecting means and projecting means for selectively applying the deflecting means to produce an intercept between the deflecting means and the spring beams, said spring beams being carried on a plurality of stacked rings with each ring having said spring beams projecting peripherally thereof and said deflecting means comprising a series of individual deflector elements to engage the spring beams on each ring and thereby exert a positive and immediate retarding influence to impede the relative movement of said means.

11. A brake assembly according to claim 10 characterized in that said rings are mounted in circularly offset relation to one another to effect an overlapping of the spring beams of adjacent rings.

12. A brake assembly for application to retard the movement of one means which moves relative to another, one said means incorporating a plurality of projecting spring beams having the form of deflectable spring fingers extending outwardly from said means, the other said means carrying deflecting means and means for selectively applying the deflecting means to produce a blocking intercept between the deflecting means and the spring fingers, said fingers being disposed so as to place a desired number of said spring fingers under deflection upon intercept by said deflecting means and thereby exert a positive and retarding influence to impede the relative movement of said means, said spring fingers being constructed to be self-restoring after intercept by said deflecting means for continuing or repeated use.

13. A brake assembly for application to retard the movement of one means which moves relative to another, one said means incorporating a plurality of cantilever spring beams and the other said means carrying deflecting means and means for actuating said deflecting means to produce an intercept between the deflecting means and the spring beams and thereby exert a positive and immediate retarding influence to impede the relative movement of said means.

14. A friction mechanism for a brake comprising a member incorporating a plurality of projecting spring beams having the form of spring fingers extending outwardly from said member for engagement with deflecting means movable relative to said member whereby said spring fingers are placed under deflection by said deflecting means and a positive and retarding influence is exerted to impede the relative movement of said deflecting means and said member.

15. A friction mechanism for a brake comprising a member incorporating a plurality of series arranged deflectable spring fingers tending resiliently to maintain an outwardly projected position, and deflecting means movable into a stressing engagement with the outer ends of said spring fingers successively to block and deflect said fingers to exert a retarding influence impeding the relative movement of said deflecting means and said member, said spring fingers being arranged in use to be self-restoring for continuing or repeated stressing engagement with said deflecting means.